(12) United States Patent
Kitano et al.

(10) Patent No.: US 6,797,363 B2
(45) Date of Patent: Sep. 28, 2004

(54) FIBER/RESIN COMPOSITE AND MOLDED ARTICLE FORMED FROM THE SAME

(75) Inventors: Katsuhisa Kitano, Ichihara (JP); Kenji Atarashi, Bartlesville, OK (US)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/725,467

(22) Filed: Dec. 3, 2003

(65) Prior Publication Data

US 2004/0126554 A1 Jul. 1, 2004

(30) Foreign Application Priority Data

Dec. 10, 2002 (JP) ........................................ 2002-357603

(51) Int. Cl.⁷ ................................................. B32B 3/00
(52) U.S. Cl. ....................... 428/172; 428/213; 428/332; 428/364; 428/388
(58) Field of Search ................................ 428/156, 172, 428/213, 332, 364, 388, 212

(56) References Cited

U.S. PATENT DOCUMENTS 5,571,356 A 11/1996 Skaletz et al.

FOREIGN PATENT DOCUMENTS

| JP | 6-240070 A | 8/1994 |
|---|---|---|
| JP | 8-3396 A | 1/1996 |
| JP | 2000-239437 A | 6/2001 |
| JP | 2001-171010 A | 6/2001 |
| JP | 2002-241557 A | 8/2002 |

*Primary Examiner*—Merrick Dixon
(74) *Attorney, Agent, or Firm*—Sughrue Mion, PLLC

(57) ABSTRACT

Disclosed is a fiber/resin composite comprising fibers (A), polypropylene resin (B) and modified polyolefin resin (C), the weight ratio of the polypropylene resin (B) to the modified polyolefin resin (C) being 99.9/0.1 to 60/40, the modified polyolefin resin (C) having a melt flow rate of 30 to 150 g/10 min, the fibers (A) being arranged parallel to each other in one direction, the composite having a length of 2 to 100 mm along the direction in which the fibers (A) are arranged, the fibers (A) having a weight average length equal to the length of the composite, wherein the polypropylene resin (B) is composed of propylene homopolymer segment (B-1) and propylene-ethylene copolymer segment (B-2), the propylene homopolymer segment (B-1) having an isotactic pentad fraction of at least 0.980 and the content of the propylene-ethylene copolymer segment (B-2) in the polypropylene resin (B) being 10 to 40% by weight.

5 Claims, No Drawings

FIBER/RESIN COMPOSITE AND MOLDED ARTICLE FORMED FROM THE SAME

BACKGROUND OF THE INVENTION

1. Field of the Invention

The present invention relates to a fiber/resin composite and a molded article obtained by molding the same. In particular, the present invention relates to a fiber reinforced molded resin article having a high impact strength and to a fiber/resin composite which is suitable as a raw material of the fiber reinforced molded resin article.

2. Description of the Related Art

Fiber-reinforced resin is an industrial material excellent in stiffness and heat resistance. Techniques for improving the impact resistance of the fiber reinforced resin are known. For example, JP-A-2002-241557 discloses a long fiber-reinforced propylene polymer composition, as a material which is capable of yielding molded articles of excellent mechanical strength, stiffness, impact resistance and endurance, that is composed of a composition made up of a modified propylene polymer which results from a modification of a propylene homopolymer with an unsaturated carboxylic acid or its anhydride and which has a melt flow rate of from 100 to 500 g/10 min, at least one substance selected from single substances, hydroxides and oxides of alkaline earth metals and glass fibers having a length of from 2 to 50 mm, a crystalline propylene-ethylene copolymer and a nucleating agent. However, there is a demand for further improvement in impact strength.

SUMMARY OF THE INVENTION

The object of the present invention is to provide fiber-reinforced molded resin articles having an impact strength higher than that of conventional fiber-reinforced molded resin articles and fiber/resin composites which are suitable as a raw material of the molded articles.

In view of such situations, the present inventors made investigations earnestly and they found that the above-mentioned object can be attained by the invention described below.

Specifically, the present invention is directed to a fiber/resin composite comprising fibers (A), a polypropylene resin (B) and a modified polyolefin resin (C), the weight ratio of the polypropylene resin (B) to the modified polyolefin resin (C), (B)/(C), being from 99.9/0.1 to 60/40, the modified polyolefin resin (C) having a melt flow rate of from 30 to 150 g/10 min, the fibers (A) being arranged parallel to each other in one direction, the composite having a length of from 2 to 100 mm along the direction in which the fibers (A) are arranged, the fibers (A) contained in the composite having a weight average length equal to the length of the composite, wherein the polypropylene resin (B) is composed of a propylene homopolymer segment (B-1) and a propylene-ethylene copolymer segment (B-2), the propylene homopolymer segment (B-1) having an isotactic pentad fraction of at least 0.980 and the content of the propylene-ethylene copolymer segment (B-2) in the polypropylene resin (B) being from 10 to 40% by weight. The invention is directed also to a molded article obtained by molding the fiber/resin composite.

DETAILED DESCRIPTION OF THE PREFERRED EMBODIMENTS

As the fibers (A), fibers such as inorganic fiber, e.g. glass fiber, carbon fiber, silicone fiber, titanium fiber, boron fiber, iron fiber and copper fiber, and organic synthetic fiber, e.g. aramid fiber, polyester fiber, polyamide fiber and vinylon, and natural fiber such as silk, cotton and hemp can be employed. Such fiber may be used either singly or in combination of two or more of them. In view of the reinforcing effect and the ease in obtainment, the glass fiber is preferred.

Examples of the glass fiber include glass fibers obtained by melt-spinning glass into filament, such as E-glass (Electrical glass), C-glass (Chemical glass), A-glass (Alkali glass), S-glass (high strength glass) and alkali-resistant glass.

The content of the fibers (A) in the fiber/resin composite of the present invention is preferably from 5 to 70% by weight from the viewpoints of stiffness, heat resistance and external appearance of molded articles obtained from the composite. The content is more preferably from 10 to 70% by weight and still more preferably from 20 to 65% by weight.

The fibers (A) preferably have a diameter of from 3 to 25 $\mu$m and more preferably from 8 to 20 $\mu$m from the viewpoint of the prevention of the breakage of the fibers.

The surface of the fibers (A) maybe applied with a treatment for imparting or improving interfacial adhesiveness to the polypropylene resin (B), such as a silane coupling agent treatment. From a fiber/resin composite containing such fibers (A) having a treated surface, molded articles excellent in strength and external appearance can be obtained.

The polypropylene resin (B) for use in the present invention is a composite polypropylene resin composed of a propylene homopolymer segment (B-1) and a propylene-ethylene copolymer segment (B-2). The propylene homopolymer segment (B-1) is a polymer segment obtained by homopolymerizing propylene, whereas the propylene-ethylene copolymer segment (B-2) is a copolymer segment obtained by randomly copolymerizing propylene and ethylene. The propylene-ethylene copolymer segment (B-2) may be a copolymer made up of three or more kinds of structural units resulting from copolymerization of propylene, ethylene and other unsaturated compound such as α-olefin, e.g. butene-1, and vinyl ester, e.g. vinyl acetate. The propylene-ethylene copolymer segment (B-2) may be a mixture thereof.

The isotactic pentad fraction of the propylene homopolymer segment (B-1) is preferably not less than 0.980, and more preferably not less than 0.985. The isotactic pentad fraction is a fraction of propylene monomer units existing at the center of an isotactic chain in the form of a pentad unit, in other words, the center of a chain in which five propylene monomer units are meso-bonded successively, in the polypropylene molecular chain as measured by a method disclosed in A. Zambelli et al., Macromolecules, 6, 925 (1973), namely, by use of $^{13}$C-NMR. It is noted that the assignment of NMR absorption peaks is conducted based on Macromolecules, 8, 687 (1975).

In view of the effect of improving the impact strength, the content of repeating units derived from ethylene in the propylene-ethylene copolymer segment (B-2) is preferably from 20 to 60% by weight, and more preferably from 30 to 50% by weight.

The content of the propylene-ethylene copolymer segment (B-2) in the polypropylene resin (B) is from 10 to 40% by weight, preferably from 15 to 35% by weight, and more preferably from 20 to 35% by weight. When the content of the propylene-ethylene copolymer segment (B-2) in the polypropylene resin (B) is less than 10% by weight, the impact strength may be insufficient. On the other hand, when the content is over 40% by weight, the stiffness of the composite may be insufficient.

From the viewpoints of avoidance of insufficient dispersion of the fibers (A) in a molded article, avoidance of poor external appearance of a molded article, and avoidance of insufficient impact resistance of the composite, the melt flow rate (henceforth referred to as MFR) measured at 230° C. under a load of 21.2 N of the polypropylene resin (B) is preferably from 20 to 100 g/10 min, and more preferably from 25 to 80 g/10 min.

The method for producing the polypropylene resin (B) may be, for example, a method comprising polymerizing propylene and other monomers by slurry polymerization, gas phase polymerization, liquid phase bulk polymerization or the like in the presence of a catalyst. The mode of polymerization to the polypropylene resin (B) includes batch polymerization and continuous polymerization. A specific embodiment of the method for producing the polypropylene resin (B) may be a method in which a propylene homopolymer segment (B-1) is produced first by homopolymerizing propylene and then a propylene-ethylene copolymer segment (B-2) is produced through a random copolymerization of propylene and ethylene in the presence of the propylene homopolymer segment (B-1) previously formed.

The modified polyolefin resin (C) for use in the present invention may be:
(1) a modified polyolefin resin obtained by graft polymerizing an unsaturated carboxylic acid and/or its derivative to an olefin homopolymer,
(2) a modified polyolefin resin obtained by graft polymerizing an unsaturated carboxylic acid and/or its derivative to a copolymer derived from at least two kinds of olefins,
(3) a modified polyolefin resin obtained by graft polymerizing an unsaturated carboxylic acid and/or its derivative to a block copolymer obtained by homopolymerization of olefin, followed by copolymerization of at least two kinds of olefins, and
(4) a modified polyolefin resin obtained by copolymerizing at least one kind of olefin and an unsaturated carboxylic acid and/or its derivative.

The modified polyolefin resin (C) may be composed of either one kind of resin or two or more kinds of resins.

Examples of the unsaturated carboxylic acid and its derivative for use in the production of the modified polyolefin resin (C) include a compound having in the molecule both (i) at least one carbon-carbon unsaturated bond and (ii) at least one group selected from the group consisting of a carboxyl group and groups derived from a carboxyl group, such a compound henceforth being referred to as a "first type compound", and a compound which can transform itself, through a reaction such as dehydration during the grafting thereof to a polyolefin resin, to a compound having in the molecule both (i) at least one carbon-carbon unsaturated bond and (ii) at least one group selected from the group consisting of a carboxyl group and groups derived from a carboxyl group, such a compound henceforth being referred to as a "second type compound."

The carbon-carbon unsaturated bond (i) may be a carbon-carbon double bond and also may be a carbon-carbon triple bond. Examples of (ii) at least one group selected from the group consisting of a carboxyl group and groups derived from a carboxyl group include a carboxyl group, and salts, esters, acid amides, acid anhydrides, imides, acid azides and acid halides resulting from substitution of the hydrogen atom or hydroxyl group of a carboxyl group.

Examples of the first type compound include unsaturated carboxylic acids and derivatives of unsaturated carboxylic acids. Examples of the second type compound include compounds which can form unsaturated carboxylic acids or derivatives of unsaturated carboxylic acids through their dehydration during their grafting to polyolefin resins.

Examples of the unsaturated carboxylic acids include maleic acid, fumaric acid, itaconic acid, acrylic acid and methacrylic acid. Examples of the derivatives of unsaturated carboxylic acids include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, monoethyl maleate, diethylmaleate, monomethyl fumarate and dimethyl fumarate. Of these unsaturated carboxylic acids and their derivatives, preferred are glycidyl acrylarte, glycidyl methacrylate and maleic anhydride.

Examples of the compounds which can form unsaturated carboxylic acids or derivatives of unsaturated carboxylic acids through their dehydration during their grafting to polyolefin resins include citric acid and malic acid.

As the method for producing the modified polyolefin resin (C), available are various methods employed for mixing resins or for mixing resin and a solid or liquid additive. Preferably, a method may be employed in which all the ingredients are mixed at a time or sequentially to form a homogeneous mixture and the mixture is then melt kneaded. When obtaining the homogeneous mixture by mixing the ingredients at a time or sequentially, it is possible to mix some ingredients to form a mixture in advance and then mix the mixture with other ingredients or a mixture thereof. The method for obtaining the homogeneous mixture may be a method comprising homogeneously mixing with a Henschel mixer, a blender such as a ribbon blender or the like. The method of melt kneading may be a melt kneading method using a Banbury mixer, a plastomill, a Brabender plastograph, a single or twin screw extruder, or the like.

From the viewpoint of being capable of performing continuous production with a high productivity, particularly preferred is a method in which a polyolefin resin, an unsaturated carboxylic acid compound and/or its derivative and organic peroxide, which have in advance been fully mixed preliminarily, are charged to a single or twin screw extruder and melt kneaded.

The graft amount of the unsaturated carboxylic acid and/or its derivative in the modified polyolefin resin (C) is preferably from 0.30 to 20% by weight, more preferably from 0.40 to 20% by weight, and still more preferably from 0.50 to 10% by weight from the viewpoints of endurance, e.g. fatigue strength, and moldability. It is noted that the graft amount is a value quantified from the absorption caused by the unsaturated carboxylic acid and/or its derivative in an infrared absorption spectrum of the modified polyolefin resin (C).

In the fiber/resin composite of the present invention, the weight ratio of the polypropylene resin (B) to the modified polyolefin resin (C), (B)/(C), is from 99.9/0.1 to 60/40 and preferably from 99.7/0.3 to 90/10 from the viewpoints of endurance, e.g. fatigue strength, and mechanical strength, e.g. stiffness and impact strength.

The MFR of the modified polyolefin resin (C) measured at 230° C. under a load of 21.2 N is from 30 to 150 g/10 min, preferably from 40 to 100 g/10 min and more preferably from 50 to 100 g/10 min from the viewpoints of endurance, e.g. fatigue strength, and mechanical strength, e.g. stiffness and impact strength.

In the fiber/resin composite of the present invention, the fibers (A) are arranged parallel to each other in one direction. The composite has a length of from 2 to 100 mm, preferably from 3 to 50 mm, along the direction in which the fibers (A) are arranged. The fiber/resin composite of the present invention is characterized in that the fibers (A) contained in the composite have a weight average length equal to the length of the composite. In the composite of the present invention, "the fibers (A) contained in the composite have a weight average length equal to the length of the composite" means that the weight average length of the fibers (A) in the composite measured by the method disclosed in JP-A-2002-5924 is from 90 to 110% of the length of the composite.

Since the fibers (A) contained in the composite have a weight average length is equal to or substantially equal to the length of the composite along the direction in which the fibers (A) are arranged, a length of the composite of less than 2 mm may result in insufficient effects of improving stiffness, heat resistance and impact strength and also may result in a large deformation of a molded article obtained from the composite. When the length of the composite is over 100 mm, it is difficult for the composite to be molded into a molded article.

An example of the method for producing the fiber/resin composite of the present invention is a method which comprises impregnating continuous fiber strands with resin while pulling the fiber strands.

Examples of the method for the impregnation include a method comprising making fiber rovings pass through a thermoplastic resin powder fluidized bed, thereby making the thermoplastic resin powder attached to the rovings and then heating the rovings with the powders to a temperature equal to or higher than the melting point of the thermoplastic resin to impregnate the rovings with the thermoplastic resin (see JP-A-46-4545), a method comprising impregnating fiber rovings with molten thermoplastic resin by use of a crosshead die (see JP-A-62-60625, JP-A-63-132036, JP-A-63-264326 and JP-A-1-208118), and a method comprising mix spinning resin fibers and fiber rovings and then heating them to a temperature equal to or higher than the melting point of the resin, thereby impregnating the fiber rovings with the resin (see JP-A-61-118235).

In the production of the fiber/resin composite of the present invention, it is preferable to mix the polypropylene resin (B) and the modified polyolefin resin (C) first to form a homogeneous mixture, followed by impregnating the fiber rovings with the mixture by the above-mentioned methods.

The fiber/resin composite of the present invention may contain various additives depending upon its application, for example, additives for modification such as dispersing agents, lubricants, plasticizing agents, flame retarders, antioxidants, antistatic agents, light stabilizers, ultraviolet absorbers, crystallization accelerators (nucleating agents), and conventional additives such as colorants, e.g. pigments and dyes, particulate fillers, e.g. carbon black, titanium oxide, talc, calcium carbonate, mica and clay, short fiber fillers, e.g. wallastonite, whiskers, e.g. potassium titanate. These additives may be incorporated during the production of the fiber/resin composite.

When the fiber/resin composite of the present invention is molded, an optionally shaped molded article excellent in impact strength can be obtained. Examples of the molding method include injection molding, compression molding, injection compression molding, gas-injecting injection molding and foam injection molding.

In particular, when the molded article of the present invention is a molded article obtained from the fiber/resin composite of the present invention by injection molding, the weight average length of the fibers (A) in the molded article is preferably from 1 to 10 mm from the viewpoints of the mechanical strength and the endurance of the molded article. It is noted that the "weight average length of the fibers (A)" used herein is the length of the fibers in the molded article, which is a weight average length measured by the method disclosed in JP-A-2002-5924.

A molded article containing the fibers (A) having a weight average length of the fibers (A) of from 1 to 10 mm can be produced by injection molding the composite of the present invention under processing conditions conventionally employed. Preferable processing conditions include: using a low back pressure during the molding, designing the screw in the molding machine to have a deep channel, using a low injection speed during the molding, designing the mold to have a wide resin passageway formed therein, and designing the nozzle of the molding machine to have a large bore.

The molded article of the present invention can be applied for a wide variety of applications. It can be used, for example, as a housing of a home electric appliance or a light electric appliance.

EXAMPLES

The present invention will be explained concretely by reference to Examples and Comparative Examples below, but the invention is not limited to the Examples.

Method for preparing a sample for evaluation

Samples for evaluations of stiffness and impact strength were prepared by injection molding fiber/resin composites under the following conditions using an injection molding machine of the following specification manufactured by Japan Steel Works, Ltd.

[Molding machine manufactured by The Japan Steel Works, Ltd.]
Clamping force: 150 ton
Screw: Screw with a deep channel
Screw diameter: 46 mm
Screw L/D: 20.3
[Molding conditions]
Cylinder temperature: 250° C.
Mold temperature: 50° C.
Back pressure: 0 MPa The methods for determining the characteristic values employed in Examples and Comparative Examples are shown below.

(1) Determination of Isotactic Pentad Fraction of Propylene Homopolymer Segment (B-1)

In o-dichlorobenzene/deuterated benzene mixed solvent (o-dichlorobenzene/deuterated benzene=3/1), 200 mg of a polypropylene resin (B) was dissolved and was measured for its $^{13}$C-NMR using AC-250 or AM-400 manufactured by Brucker.

(2) Content (% by Weight) of Propylene-ethylene Copolymer Segment (B-2) in Polypropylene Resin and Content (% by Weight) of Ethylene Units in Propylene-ethylene Copolymer Segment (B-2)

The content (% by weight) of the propylene-ethylene copolymer segment (B-2) and the content (% by weight) of ethylene units in the propylene-ethylene copolymer segment (B-2) were determined from a $^{13}$C-NMR spectrum measured under the following conditions based on the report by Kakugo et al., (Macromolecules 1982, 15, 1150–1152).

A sample was prepared by homogeneously dissolving about 200 mg of a propylene resin (B) in 3 ml of o-dichlorobenzene in a 10 mmϕ test tube. Then, a $^{13}$C-NMR spectrum of the sample was measured under the following conditions using JNM-EX270 manufactured by JEOL Ltd.

Measuring temperature: 135° C.
Pulse repeating time: 10 seconds
Pulse width: 45°
Number of integrations: 2500
(3) Intrinsic Viscosity ([η], dl/g)

Reduced viscosities were measured at three points of concentrations of 0.1, 0.2 and 0.5 g/dl using a Ubbellohde type viscometer. Intrinsic viscosity was calculated by a calculation method described on page 491 in "Kobunshi Yoeki (Polymer Solution), Kobunshi Jikkengaku (Polymer Experiment Study) 11" (published by Kyoritsu Shuppan K. K., 1982), namely, by an extrapolation method in which reduced viscosities are plotted against concentrations and the concentration is extrapolated in zero. The evaluation was conducted using tetralin as a solvent at a temperature of 135° C.

(4) Maleic Anhydride-graft Amount (% by Weight)

In 100 ml of xylene, 1.0 g of a sample was dissolved. The solution was dropped to 1000 ml of methanol under stirring and a solid formed was recovered. The recovered solid was vacuum dried (80° C., 8 hours) and then hot pressed to form a film 100 µm thick. The film was measured for its infrared spectrum. A maleic anhydride-graft amount was determined from an absorption near 1780 cm$^{-1}$ according to the method described by Fumio Ide et al., "High Polymer Chemistry", Vol. 25, 107–115 (1968).

(5) Melt Flow Rate (MFR) (g/10 min)

The melt flow rate was measured per ASTM D1238 under the following conditions.
Measuring temperature: 230° C.
Load: 21.2 N (6) Flexural Modulus (MPa)

The flexural modulus was determined per ASTM D790 under the following conditions.
Measuring temperature: 23° C.
Sample thickness: 6.4 mm
Span: 100 mm
Tensile rate: 2 mm/min (7) IZOD Impact Strength (KJ/m$^2$)

The IZOD impact strength was measured per ASTM D256 under the following conditions.
Measuring temperature: 23° C.
Sample thickness: 6.4 mm
[After molding, the sample was notched.]

(8) Weight Average Length of Fibers (mm)

The weight average length of fibers was determined by the method disclosed in JP-A-2002-5924.

Example 1

To 100 parts by weight of a polypropylene resin (made up of a propylene homopolymer segment and a propylene-ethylene copolymer segment; the intrinsic viscosity [η]=2.8 dl/g, the content of the propylene-ethylene copolymer segment=21% by weight), 1.0 part by weight of maleic anhydride, 0.50 part by weight of dicetyl peroxydicarbonate, 0.15 part by weight of 1,3-bis(tert-butyl-peroxydiisopropyl) benzene, 0.05 part by weight of calcium stearate, and 0.3 part by weight of an antioxidant tetrakis[methylene-3-(3,5-di-tert-butyl-4-hydroxyphenyl) propionate]methane were added and fully pre-mixed in a Henschel mixer. Then the mixture was fed to a single screw extruder and was melt-kneaded to form a modified polyolefin resin (I). The resulting modified polyolefin resin (I) had a maleic anhydride-graft amount of 0.64% by weight and an MFR of 70 g/10 min. The single screw extruder used was a single screw extruder EXT-90 (L/D=36, cylinder diameter=90 mm) manufactured by Isuzu Kakoki, Co., Ltd. The cylinder temperature was set to 180° C. for the first half and to 250° C. for the second half. The rate of screw rotation was 133 rpm.

Glass rovings (manufactured by Asahi Fiber Glass Co., Ltd., diameter=16 µm, 4000 fibers in a bundle) were spread into a strip and, while being kept spread, they were passed through a molten resin (II) which was extruded from an extruder and was accumulated. Subsequently, the glass rovings which were spread in the molten resin (II) were bundled and the bundle of the glass rovings were pullled through a nozzle. After being cooled, the bundle was cut into a length of 9 mm to yield pellets (III) of a fiber/resin composite containing 40% by weight of glass fiber.

The molten resin (II) was a resin consisting of a polypropylene resin (IV) manufactured by Sumitomo Mitsui Polyolefin Co., Ltd. and the aforementioned modified polyolefin (I).

The polypropylene resin (IV) was made up of a propylene homopolymer segment (B-1) and a propylene-ethylene copolymer segment (B-2) and had an MFR of 49 g/10 min. The content of the propylene homopolymer segment (B-1) in the polypropylene resin (IV) was 73% by weight and the isotactic pentad fraction of the propylene homopolymer segment was 0.985. The content of the propylene-ethylene copolymer segment (B-2) in the polypropylene resin (IV) was 27% by weight and the content of the repeating units derived from ethylene in the propylene-ethylene copolymer segment (B-2) was 33% by weight. The polypropylene resin (IV) was prepared by the method disclosed in JP-A-2002-30128.

In the pellets (III) of the fiber/resin composite, the weight ratio of the polypropylene resin (IV) to the modified polyolefin resin (I), (IV)/(I), was 96.7/3.3.

The resulting pellets (III) of the fiber/resin composite were injection molded. The flexural modulus and IZOD impact strength of the infection molded sample are shown in Table 1. The glass fibers in the resulting sample had a weight average length of 4 mm.

Example 2

The operations of Example 1 were repeated except that a 1:1 mixture of the polypropylene resin (IV) and a propylene homopolymer (J139 manufactured by Sumitomo Mitsui Polyolefin Co., Ltd., the isotactic pentad fraction=0.985, the MFR 60 g/10 min) was used in place of the polypropylene resin (IV) used in Example 1. The flexural modulus and IZOD impact strength of the injection molded sample are shown in Table 1. The glass fibers in the resulting sample had a weight average length of 4 mm.

Comparative Example 1

The operations of Example 1 were repeated except that WP712F manufactured by Sumitomo Mitsui Polyolefin Co. Ltd. (made up of a propylene homopolymer segment (B-1) and a propylene-ethylene copolymer segment (B-2); MFR= 15 g/10 min, the content of the propylene homopolymer segment (B-1)=71% by weight, isotactic pentad fraction of the propylene homopolymer segment (B-1)=0.970, the content of the propylene-ethylene copolymer segment (B-2) having a content of the repeating units derived from ethylene of 33% by weight=29% by weight) was used in place of the polypropylene resin (IV) used in Example 1, that a maleic anhydride-modified polypropylene resin (MPE331 manufactured by Sumitomo Mitsui Polyolefin Co., Ltd., MFR=40 g/10 min) was used in place of the modified polyolefin resin (I), and that the weight ratio of the polypropylene resin (WP712F manufactured by Sumitomo Mitsui Polyolefin Co., Ltd.) to the modified polypropylene resin (MPE331 manufactured by Sumitomo Mitsui Polyolefin Co., Ltd.) was set to 90.0/10.0. The flexural modulus and IZOD impact strength of the injection molded sample are shown in Table 1. The glass fibers in the resulting sample had a weight average length of 4 mm.

Comparative Example 2

The operations of Example 1 were repeated except that a propylene homopolymer manufactured by Sumitomo Mitsui Polyolefin Co. Ltd. (U501E-1; isotactic pentad fraction= 0.970, MFR=120 g/10 min) was used in place of the polypropylene resin (IV) used in Example 1, that a maleic anhydride-modified polypropylene resin (MPE331 manufactured by Sumitomo Mitsui Polyolefin Co., Ltd., MFR=40 g/10 min) was used in place of the modified polyolefin resin (I), and that the weight ratio of the polypropylene resin (U501E-1 manufactured by Sumitomo Mitsui Polyolefin Co., Ltd.) to the modified polypropylene resin (MPE331 manufactured by Sumitomo Mitsui Polyolefin Co., Ltd. was set to 90.0/10.0. The flexural modulus and IZOD impact strength of the injection molded sample are shown in Table 1. The glass fibers in the resulting sample had a weight average length of 4 mm.

TABLE 1

| | Flexural Modulus (MPa) | IZOD Impact Strength (KJ/m$^2$) |
|---|---|---|
| Example 1 | 6330 | 44 |
| Example 2 | 6900 | 33 |
| Comparative Example 1 | 5700 | 43 |
| Comparative Example 2 | 7160 | 27 |

In each of Examples 1 and 2, a high stiffness (flexural modulus) and a high impact strength (IZOD impact strength) were achieved.

In contrast, in Comparative Example 1, in which a requirement of the present invention with respect to the isotactic pentad fraction of a propylene homopolymer segment (B-1) is not satisfied, an insufficient stiffness (flexural modulus) was obtained. In Comparative Example 2, in which a polypropylene homopolymer was used without use of a polypropylene resin made up of a propylene homopolymer segment (B-1) and a propylene-ethylene copolymer segment (B-2), an insufficient impact strength (IZOD impact strength) was obtained.

As described in detail above, the present invention can provide fiber-reinforced molded resin articles having an impact strength higher than that of conventional fiber-reinforced molded resin articles, and fiber/resin composites which are suitable as a raw material of the same.

What is claimed is:

1. A fiber/resin composite comprising fibers (A), a polypropylene resin (B) and a modified polyolefin resin (C), the weight ratio of the polypropylene resin (B) to the modified polyolefin resin (C), (B)/(C), being from 99.9/0.1 to 60/40, the modified polyolefin resin (C) having a melt flow rate of from 30 to 150 g/10 min, the fibers (A) being arranged parallel to each other in one direction, the composite having a length of from 2 to 100 mm along the direction in which the fibers (A) are arranged, the fibers (A) contained in the composite having a weight average length equal to the length of the composite, wherein the polypropylene resin (B) is composed of a propylene homopolymer segment (B-1) and a propylene-ethylene copolymer segment (B-2), the propylene homopolymer segment (B-1) having an isotactic pentad fraction of at least 0.980 and the content of the propylene-ethylene copolymer segment (B-2) in the polypropylene resin (B) being from 10 to 40% by weight.

2. The fiber/resin composite according to claim 1, wherein the polypropylene resin (B) has a melt flow rate of 20–100 g/10 min.

3. The fiber/resin composite according to claim 1, wherein the content of the fibers (A) in the fiber/resin composite is 5–70% by weight.

4. The fiber/resin composite according to claim 1, wherein the fibers (A) are glass fibers.

5. A molded article obtained by molding the fiber/resin composite according to any one of claims 1–4, wherein the fibers (A) in the molded article have a weight average length of at least 1 mm.

* * * * *